United States Patent [19]
Kimura

[11] Patent Number: 4,988,988
[45] Date of Patent: Jan. 29, 1991

[54] CENTRAL MONITORING AND ALARMING SYSTEM

[75] Inventor: Tetsuo Kimura, Tokyo, Japan

[73] Assignee: Nittan Company Ltd., Japan

[21] Appl. No.: 416,838

[22] Filed: Oct. 3, 1989

[30] Foreign Application Priority Data

Oct. 20, 1988 [JP] Japan ............ 63-262777

[51] Int. Cl.[5] ............ G05B 23/02; H04M 11/04

[52] U.S. Cl. ............ 340/825.06; 340/310 R; 340/825.16; 340/825.17; 364/550

[58] Field of Search ............ 340/502, 504, 505, 514, 340/310 R, 310 A, 825.06–825.17, 825.52; 379/92, 104, 106; 364/138, 550, 579

[56] References Cited

U.S. PATENT DOCUMENTS

| | | | |
|---|---|---|---|
| 3,921,139 | 11/1975 | Hardesty, Jr. et al. | 340/825.52 |
| 4,329,643 | 5/1982 | Neumann et al. | 340/514 |
| 4,402,055 | 8/1983 | Lloyd et al. | 364/579 |
| 4,535,332 | 8/1985 | Miller et al. | 340/825.06 |
| 4,535,401 | 8/1985 | Penn | 340/825.06 X |
| 4,573,115 | 2/1986 | Halgrimson | 340/825.06 X |
| 4,658,243 | 4/1987 | Kimura et al. | 340/825.08 X |
| 4,697,180 | 9/1987 | Swanson | 340/310 A X |
| 4,823,290 | 4/1989 | Fasack et al. | 340/825.06 X |

FOREIGN PATENT DOCUMENTS

| | | |
|---|---|---|
| 1451367 | 9/1976 | United Kingdom . |
| 2051438 | 1/1981 | United Kingdom . |

*Primary Examiner*—Ulysses Weldon
*Attorney, Agent, or Firm*—Stevens, Davis, Miller & Mosher

[57] ABSTRACT

A central monitoring and alarming system for monitoring and alarming an abnormal condition, for example fire and gas leakage, includes a central monitoring station having a memory device and a signal processor, plural terminals returning information detected by sensors included therein and a supporting terminal unit for specifying a proper address assigned to the terminal units respectively so that an operator can reliably know an address without looking at an address setter disposed in a terminal unit.

7 Claims, 5 Drawing Sheets

FIG. 1
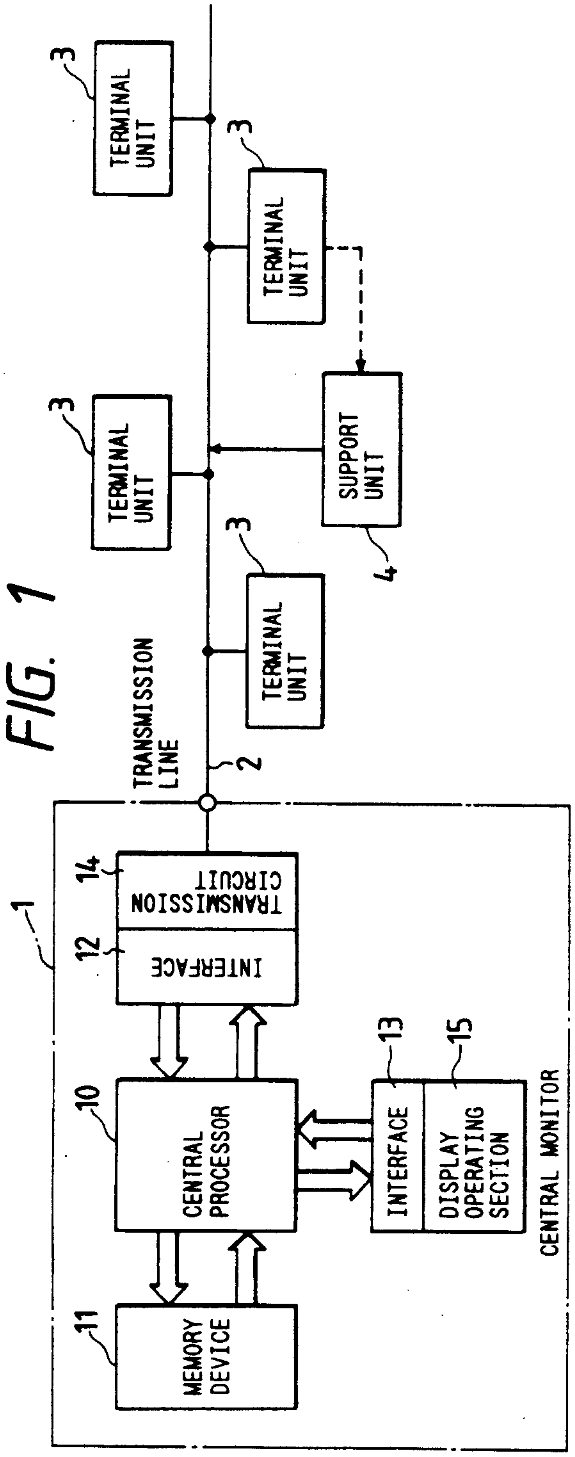
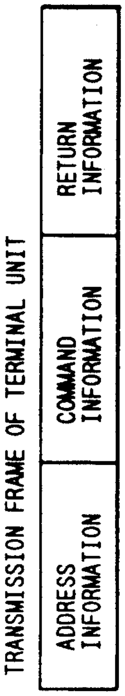
FIG. 3A
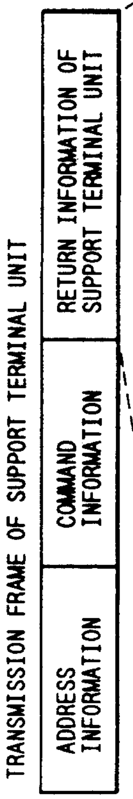
FIG. 3B
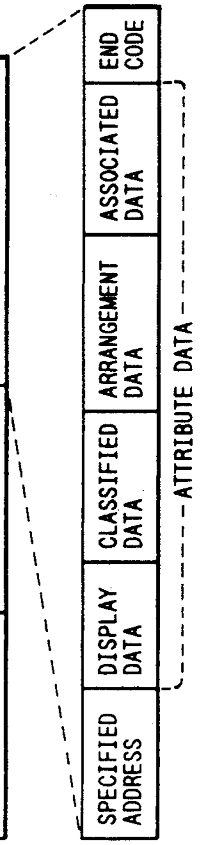
FIG. 3C

CENTRAL MONITORING AND ALARMING SYSTEM

BACKGROUND OF THE INVENTION

The present invention relates to a central monitoring and alarming system for central-monitoring fire, gas leakage, or the like, to produce an alarm indicating an occurrence of such an abnormal condition.

In the conventional central monitoring and alarming system for central-monitoring fire, gas leakage or the like, a central monitoring station is connected to a plurality of terminal units, each has a sensor or a controller through a transmission line. Proper addresses are assigned to the respective terminal units. The terminal units return information detected by the sensor to central monitoring station in response to a sequential call from the central monitoring station. The central monitoring station judges whether an abnormal condition occurs based on the returned data from the respective terminal units. If the abnormal condition occurs, the central monitoring station displays the abnormal condition and a place where the abnormal condition occurs and produces an alarm indicating an occurrence of the abnormal condition. Further, the central monitoring station transmits control commands to each of the terminal units to control an equipment for preventing the disasters.

In such a conventional central monitoring and alarming system, attribute data such as data representing a sensor setting condition, displaying data under the abnormal condition, data for controlling the equipment for preventing the disasters are stored in a memory device of the central monitoring station. The attribute data stored in the memory device corresponds to each of the terminal units. In general, the installation places of the sensor and the equipment for preventing of disasters and the number of these members are often changed during a period for adjusting the central monitoring and alarming system in the construction site in a large scale central monitoring and alarming system. Accordingly, the number and the address of the terminal units and the attribute data are often changed. The addresses of the terminal units can be confirmed by an address setter included in the terminal units. But when the specific addresses is set by a ROM (read only memory) the addresses of terminal unit can not be confirmed visually. Therefore, in both cases, it takes a long time to confirm the addresses. The content of the attribute data to be changed is known from the results of an operation test of the respective terminal units. Accordingly, when such information of the result of the operation test are transmitted to an operator on the side of the central monitoring station and the attribute data are then changed, the operator often makes a mistake and it takes a long time to change the attribute data. Further, in the conventional central monitoring and alarming system, it is hard to change the attribute data stored in the memory device of the central monitoring station at a place where the terminal unit is installed.

SUMMARY OF THE INVENTION

The present invention is to solve the above-mentioned problems. An object of the present invention is to provide a central monitoring and alarming system in which an operator can know an address assigned to each of terminal reliably without looking at an address setter disposed in a terminal unit.

Another object of the present invention is to provide a central monitoring and alarming system for easily performing an installation thereof.

To attain the above objects of the present invention, a central monitoring and alarming system comprises a central monitoring station having a memory device for storing various kinds of data and a signal processing means, the central monitoring station detecting an occurrence of an abnormal condition at places to be monitored by the system to produce a controlling signal to control equipments for preventing from disasters expanding, a transmission line extending from the central monitoring station to the places to be monitored, a plurality of terminal units having sensors for detecting the abnormal condition and address setting means for setting an address assigned to each of terminal units, the terminal unit being connected in parallel to the transmission line to transmit information detected by the sensors to the central monitoring station in response to an addressing signal outputted from the central monitoring station, and a supporting terminal unit which is connected to the transmission line to receive the controlling signal and addressing signal from the central monitoring station, the supporting terminal unit being detachably connected to one of the terminal units, the assigned address of which is to be discriminated and the supporting terminal unit discriminating the assigned address with reference to the addressing signal which is received when the supporting terminal unit receives an address conformity signal, the address conformity signal being generated by the terminal unit when a address code in the addressing signal coincides with the assigned address.

In the central monitoring and alarming systems of the present invention constructed above, an operator can know the address of a terminal unit by the support terminal unit disposed in the vicinity of the terminal unit. Therefore, the attribute data stored in the central monitoring station which corresponds to the each of the terminal units can be reliably changed or added.

BRIEF DESCRIPTION OF THE DRAWINGS

The present invention will be more apparent from the following description of the preferred embodiments thereof in conjunction with the accompanying drawings in which:

FIG. 1 is a block diagram showing the entire construction of a central monitoring and alarming system in accordance with one embodiment of the present invention;

FIGS. 3A, 3B, and 3C are explanatory diagrams showing a transmission frame of the central monitoring and alarming system;

DESCRIPTION OF THE PREFERRED EMBODIMENTS

Figure 2:
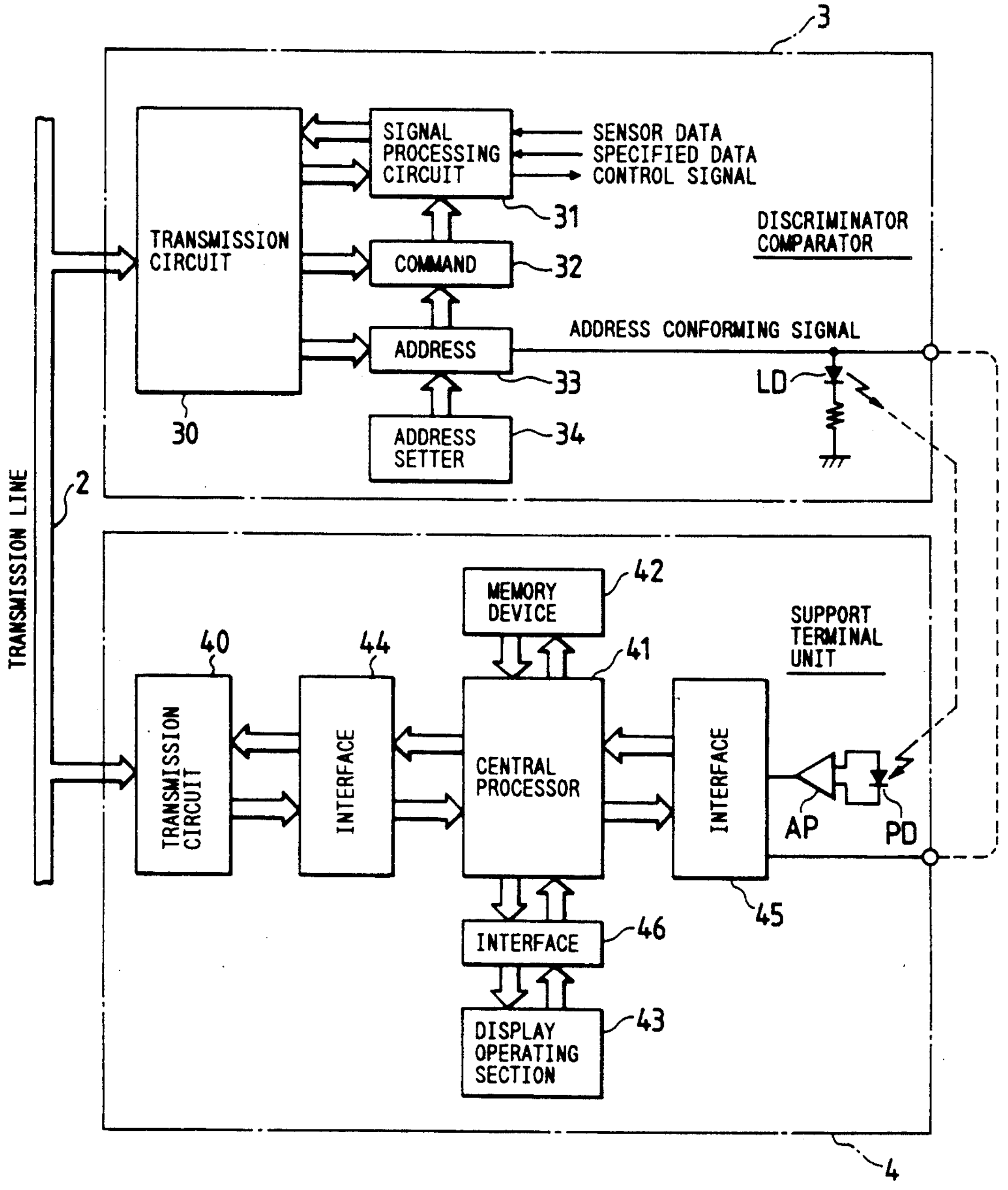
FIG. 2 is a block diagram showing an embodiment of a terminal unit and a supporting terminal unit of the monitoring alarm system.

Preferred embodiments of a central monitoring and alarming system of the present invention will be described in detail with reference to the accompanying drawings.

FIG. 1 is a block diagram showing the entire construction of a central monitoring and alarming system according to the present invention. The central monitoring and alarming system comprises a central monitoring station 1, a transmission line 2 extending from the central monitoring station 1, a plurality of terminal units 3 connected in parallel to the transmission line 2, and a supporting terminal unit 4 connected to the transmission line 2. The terminal units 3 are assigned addresses in advance. The central monitoring station 1 comprises a memory device 11 for storing programs, the assigned addresses and various kinds of data, a central processor 10 such as a micro processor, a transmission circuit 14 for performing data communications between the central monitoring station 1 and the respective terminal units 3 or the supporting terminal unit 4, an interface 12 for the transmission circuit 14, a displaying/operating section 15 including operational switches and indicators and an interface 13 for this displaying/operating section 15.

The operation of the central monitoring and alarming system constructed as above will be described. The central processor 10 of the central monitoring station 1 executes a processing program stored in the memory device 11. Normally, the central processor 10 transmits an addressing signal to the respective terminal units 3 sequentially through the transmission circuit 14. The terminal unit 3 which is designated by the addressing signal transmits the output of a sensor for detecting fire, gas leakage or the like back to the central processor 10, so that the central processor 10 judges whether or not there occurs an abnormal condition based on the output of the sensor. When the abnormal condition occurs, the central processor 10 operates the displaying/operating section 15 through the interface 13 to display detail of the abnormal condition, i.e., abnormal state, a place where the abnormal condition occurs and to give an alarm. Further, the central processor 10 issues control commands to the terminal unit 3 in which the sensor detects the abnormal condition to control an equipment for recovering the abnormal condition such as a device for exhausting harmful gas, a device for extinguishing fire, a fire door for preventing fire from expanding or the like. The judgment of abnormal condition, the display of the abnormal condition, and an ganged control of the recovering equipments are performed on the basis of attribute data including classification data, indication data and association data stored in the memory device 11. The attribute data stored in the memory device 11 correspond to the addresses of the respective terminal units 3, so that they can be changed or added by using the displaying/operating section 15. A rewritable memory such as RAM is used as the memory device 11 to store an attribute data table containing the above described data. Upon an installation of the present system in the construction site, the supporting terminal unit 4 is detachably connected to the transmission line 2 and one of the terminal unit 3 to receive both an addressing signal from the central monitoring station 1 and a address conformity signal from the terminal unit 3. When the supporting terminal unit 4 receives the address conformity signal from the terminal unit 3, the terminal unit 4 operates to display an address assigned to the connected terminal in response to the addressing signal. Accordingly, it is possible to confirm the assigned address of the terminal unit 3 at the installation cite without looking at the address setter contained in the terminal unit 3. Further, it is also possible for the operation in the side of the supporting terminal unit 4 to change, modify or add the attribute data corresponding to the terminal unit 3 specified by the operational input from the side of the supporting terminal unit 4. As a method for specifying an address assigned to a terminal unit to be modified the attribute data, there are three method as follow.

(a) The address of the terminal to be modified the attribute data is specified based on a specified data returned from the terminal 3. In this time, the specified data is set by the address setter and is returned to the central monitoring station through the transmission line in response to the calling operation.

(b) The address of the terminal is specified by the operating input from the supporting terminal unit 4 when the address assigned to the terminal have been know already.

(c) The address of the terminal is specified based on the calling address when the supporting terminal unit receives the address conformity signal from the terminal unit 3.

When the central monitoring station 1 calls the supporting terminal unit 4 and the attribute data (which include the specified address in a certain case) are transmitted to the central monitoring station 1 from this supporting terminal unit 4, the central processor 10 changes or adds the attribute data of the memory device 11 based on these returned data. Thus, the attribute data can be edited, changed or added by the operational input of the support terminal unit 4.

FIG. 2 is a block diagram showing a concrete example of the terminal unit 3 and the support terminal unit 4. The terminal unit 3 comprises a transmission circuit 30, an address setter 34 for setting an assigned address, an address comparator 33 for comparing the received address with the assigned address and outputting the conformity signal of these addresses, a command discriminator 32 for discriminating the kind of commands, and a signal processing circuit 31 for outputting return data or a control signal. The address conformity signal from the address comparator 33 is supplied to the supporting terminal unit 4 directly or optically. When optically, the address conformity signal is converted through a photodiode LD.

The operation of the terminal unit 3 constructed above will be described. The transmission circuit 30 is normally placed in a signal receiving state to receive an addressing signal from the central monitoring station 1 through the transmission line 2. The transmission circuit 30 supplies an address code contained in the addressing signal to the address comparator 33 to be compared with the assigned address set by the address setter 34. Upon the compared signals are coincide each other, the comparator 33 supplies the address conformity signal to the command discriminator 32 and the support terminal unit 4. When the address conformity signal from the address comparator 33 is received by the command discriminator 32, the command discriminator 32 analyzes the command signal contained in the addressing signal from the transmission circuit 30. In the normal monitoring state, the commands show the collection of the data from the sensors and the command discriminator 32 thus supplies a control signal corresponding to these commands to the signal processing circuit 31. The signal processing circuit 31 supplies the detected data from the sensor or the specified data provided by a setting switch to the transmission circuit 30. The transmission circuit 30 outputs these data to the transmission line 2 in accordance with a predetermined format. When the command signal analyzed by the command discriminator 32 is the controlling signal for equipment for recovering disaster, the signal processing circuit 31 outputs the control signal to the equipment to control the operation of the equipment.

The supporting terminal unit 4 comprises transmission circuit 40 connected to the transmission line 2, a central processor 41 such as a micro processor, a memory device 42 for storing programs and data, a displaying/operating section 43 including various kinds of operational switches and indicators, interfaces 44, 45, 46 for respective inputting and outputting devices, an amplifier AP, and a photodiode PD. The central processor 41 executes a processing program stored in the memory device 42 so as to put the transmission circuit 40 in a signal-receiving state as a standby state. The transmission circuit 40 receives an addressing signal including an address code from the central monitoring station 1. The signal is inputted to the central processor 41 through the interface 44 in which the addressing code from the transmission circuit 40 is compared with a assigned address set in this central processor 41. When these addresses do not conform to each other, the address code thus received is stored in the memory device 42 temporarily.

When the supporting terminal unit 4 is used to display the address, the address conformity signal from the terminal unit 3 is inputted to the interface 45 directly or through the photodiode PD and the amplifier AP. When the central processor 41 receives the address conformity signal, the processor 41 reads out the address inputted from the central monitoring station 1 and then stored in the memory device 42 so as to control the displaying/operating section 43 through the interface 46. The indicator of the displaying/operating section 43 displays this address digitally. Namely, the assigned address of the terminal unit 3 outputting the address conforming signal can be displayed.

When the supporting terminal unit 4 is used to write the attribute data, it is necessary to specify the address of the terminal unit 3 whose attribute data are to be modified. This specifying method is selected from method for transmitting the specified data from the terminal unit 3, and method for transmitting the specified address from the supporting terminal unit 4 together with the attribute data. As the method for transmitting the specified address from the supporting terminal unit 4, there are two methods, a first case in which the address is designated by the operational input of the supporting terminal unit 4, and a second case in which the addressing signal from the central monitoring station 1 is discriminated so that the address code in the addressing signal which is received upon receptions of the address conforming signal from the terminal unit 3 is used as the specified address.

When the specified data are transmitted to the central monitoring station 1 from the terminal unit 3, the attribute data inputted by an operating section of the displaying/operating section 43 of the supporting terminal unit 4 are stored in the memory device 42. Then, the attribute data stored in the memory device 42 are transmitted to the central monitoring station in response to the addressing from the central monitoring station 1.

When the specified address is transmitted from the supporting terminal unit 4 to the central monitoring station 1 either the address data set by the key-operational input of the displaying/operating section 43 or the address which is received when the inputting the address conforming signal is received from the terminal unit 3 is transmitted as the specified address to the central monitoring station 1 together with the attribute data. The central monitoring station 1 changes or adds a corresponding table of the attribute data with reference to the specified data from the terminal unit 3, or the specified address and the attribute data from the support terminal unit 4.

FIGS. 3A to 3C show one example of a transmission frame (FIG. 3A) of the terminal unit 3 and transmission frames (FIGS. 3B and 3C) of the supporting terminal unit 4. The returned information from the terminal unit 3 and the supporting terminal unit 4 are outputted in response to the address and command information as the call signal from the central monitoring station. The frame (FIG. 3C) shows the detailed returned information of the support terminal unit 4.

Figure 4:
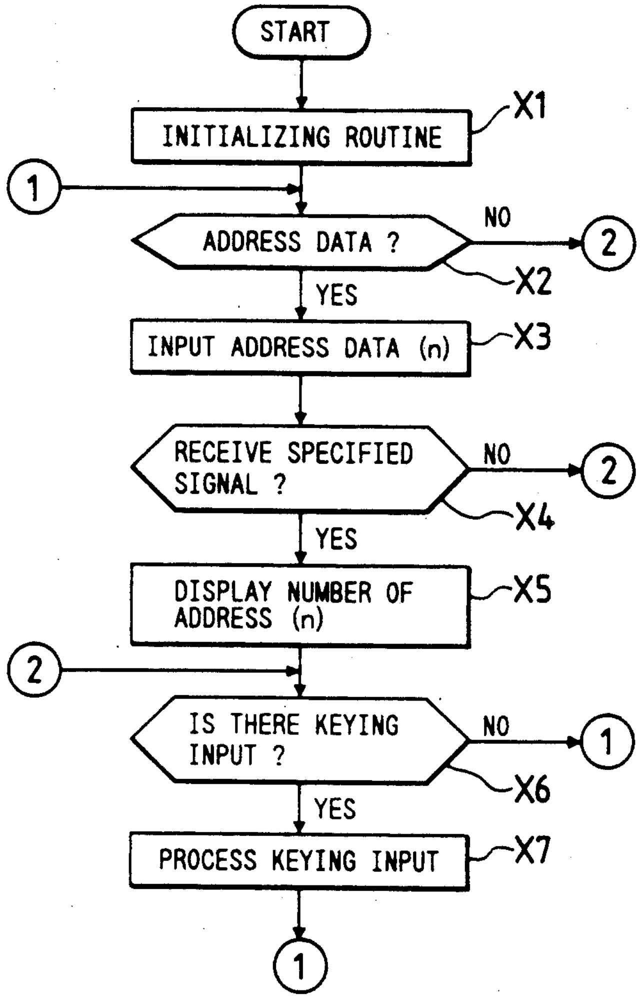
FIGS. 4 and 5 are flow charts showing one example of a processing program executed by the supporting terminal unit.

FIG. 4 shows a flow chart illustrating one example of the processing program executed by the central processor 41 for the supporting terminal unit 4 used to perform the address display. When this support terminal unit 4 is in an operating state, an initializing routine in step X1 is executed to initialize the memory device and the inputting and outputting devices. In step X2, it is judged whether or not the received signal shows address data. When the judging result in this step is YES, it proceeds to step X3. Conversely, when the judging result in this step is NO, it proceeds to step X6. In step X3, these address data (n) are inputted. In step X4, it is judged whether the specified signal (address conforming signal) is provided from the terminal unit. When the judging result in this step X4 is YES, it proceeds to step X5. Conversely, when the judging result in this step X4 is NO, it proceeds to step X6. In step X5, the address (n) inputted in step X3 is displayed. In step X6, it is judged whether or not there is a key-operational input from the operating section. When the judging result in this step X6 is YES, it proceeds to step X7. Conversely, when the judging result in this step X6 is NO, it returns to step X2, thereby returning to the signal receiving state. The step X7 shows a routine for performing a processing operation with respect to the operational input. Namely, in accordance with the program in this step, the address signal is inputted from the central monitoring station 1 with respect to the received signal on the transmission line, and this address is displayed when the address conforming signal is supplied from the terminal unit 3.

Figure 5:
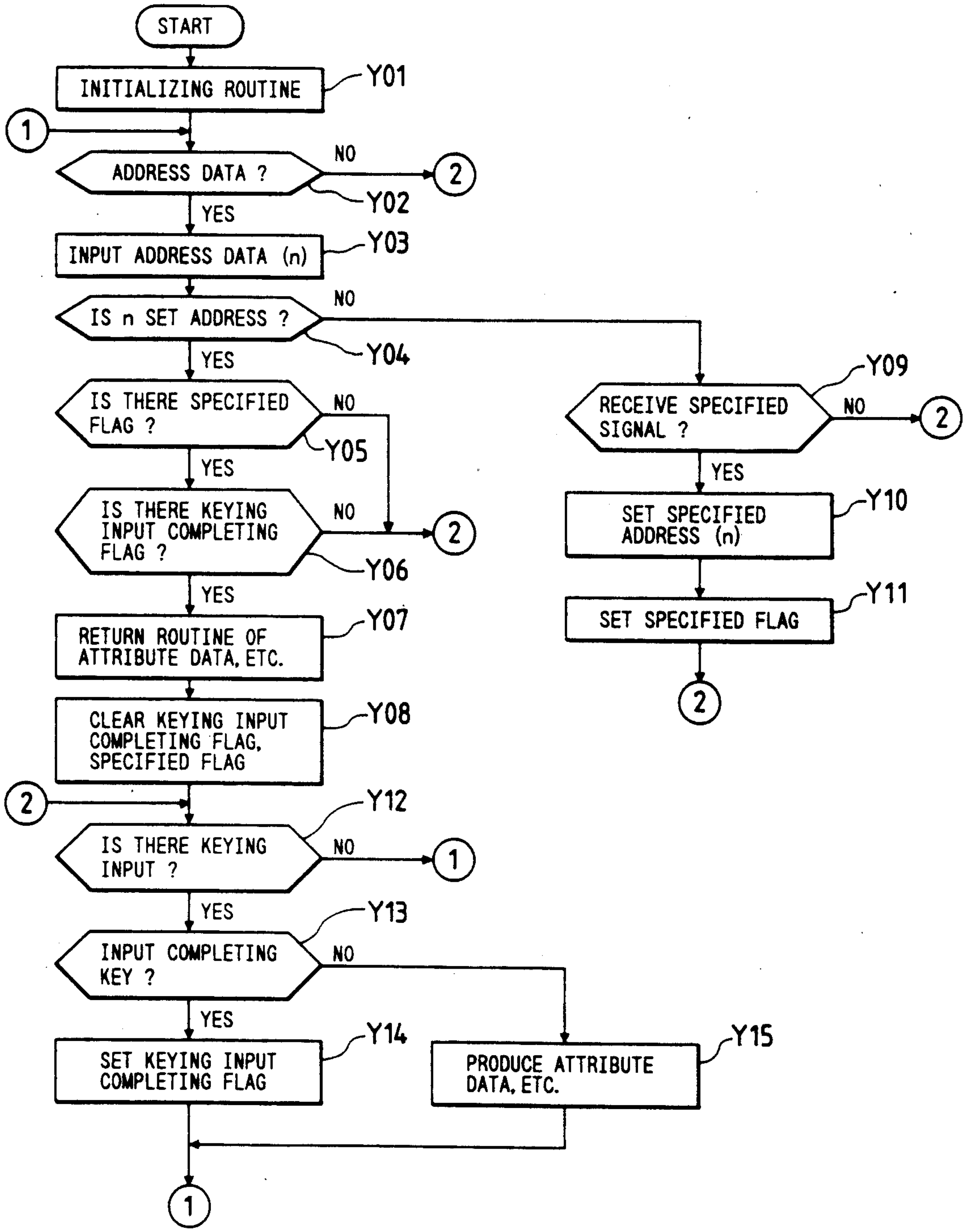

FIG. 5 shows a flow chart illustrating one example of the processing program executed by the central processor 41 for the supporting terminal unit 4 used to perform the writing operation of the attribute data. When this supporting terminal unit 4 is in the operating state, the initializing routine is executed in a first step Y01 to initialize the memory device and the inputting and outputting devices. In step Y02, it is judged whether the received signal shows address data. When the judging result in this step is YES, it proceeds to step Y03. Conversely, when the judging result in this step is NO, it proceeds to step Y12. In step Y03, these address data (n)

are inputted. In step Y04, it is judged whether the inputted address conforms to the set address or not. When the inputted address conforms to the set address, the judging result is YES and it proceeds to step Y05. When the judging result is NO, it proceeds to step Y09. In step Y05, it is judged whether a specified flag is set or not. When the specified flag is set, the judging result in this step Y05 is YES and it proceeds to step Y06. When the specified flag is not set, the judging result in this step Y05 is NO and it proceeds to step Y12. In the step Y06, it is judged whether there is a flag for completing the keying input. When this judging result is YES, it proceeds to step Y07. Conversely, when this judging result is NO, it proceeds to step Y12. The step Y07 shows a return routine of the attribute data and the specified address. In step Y08, the keying input completing flag and the specified flag are reset. In step Y09, it is judged whether there is the specified signal or not. When this judging result is YES, it proceeds to step Y10. Conversely, when this judging result is NO, it proceeds to step Y12. In the step Y10, the received address (n) is set as the specified address. In step Y11, the specified flag is set. In the step Y12, it is judged whether there is the key-operational input or not. When this judging result is YES, it proceeds to step Y13. Conversely, when this judging result is NO, it returns to step Y02, thereby repeating the similar processing from the beginning. In step Y13, it is judged whether it is an input completing key or not. When the judging result in this step is YES, it proceeds to step Y14. Conversely, when the judging result in this step is NO, it proceeds to step Y15. In the step Y14, the keying input completing flag is set to display the completion of the production of the attribute data and the specified address. The step Y15 shows a routine for producing the attribute data or the specified address based on the keying input. When the step Y14 or Y15 is completed, it returns to the step Y02 and the similar processing are performed from the beginning. Namely, in accordance with the program, the call signal from the central monitoring station 1 is received. Then, when the central monitoring station 1 calls the terminal unit and the specified address and the attribute data have been completely set, these address and data are returned to the central monitoring station 1. When the central monitoring station 1 does not call the terminal unit, the specified address is set on the basis of the address conforming signal from the terminal unit 3. Further, the above program has a routine in which the attribute data based on the keying input are produced when these processing have been completed. The above-mentioned processing routines are repeatedly executed.

When the specified data are returned from the terminal unit 3, steps Y05, Y09, Y10 and Y11 are omitted in the flow chart in FIG. 5.

Figure 6:
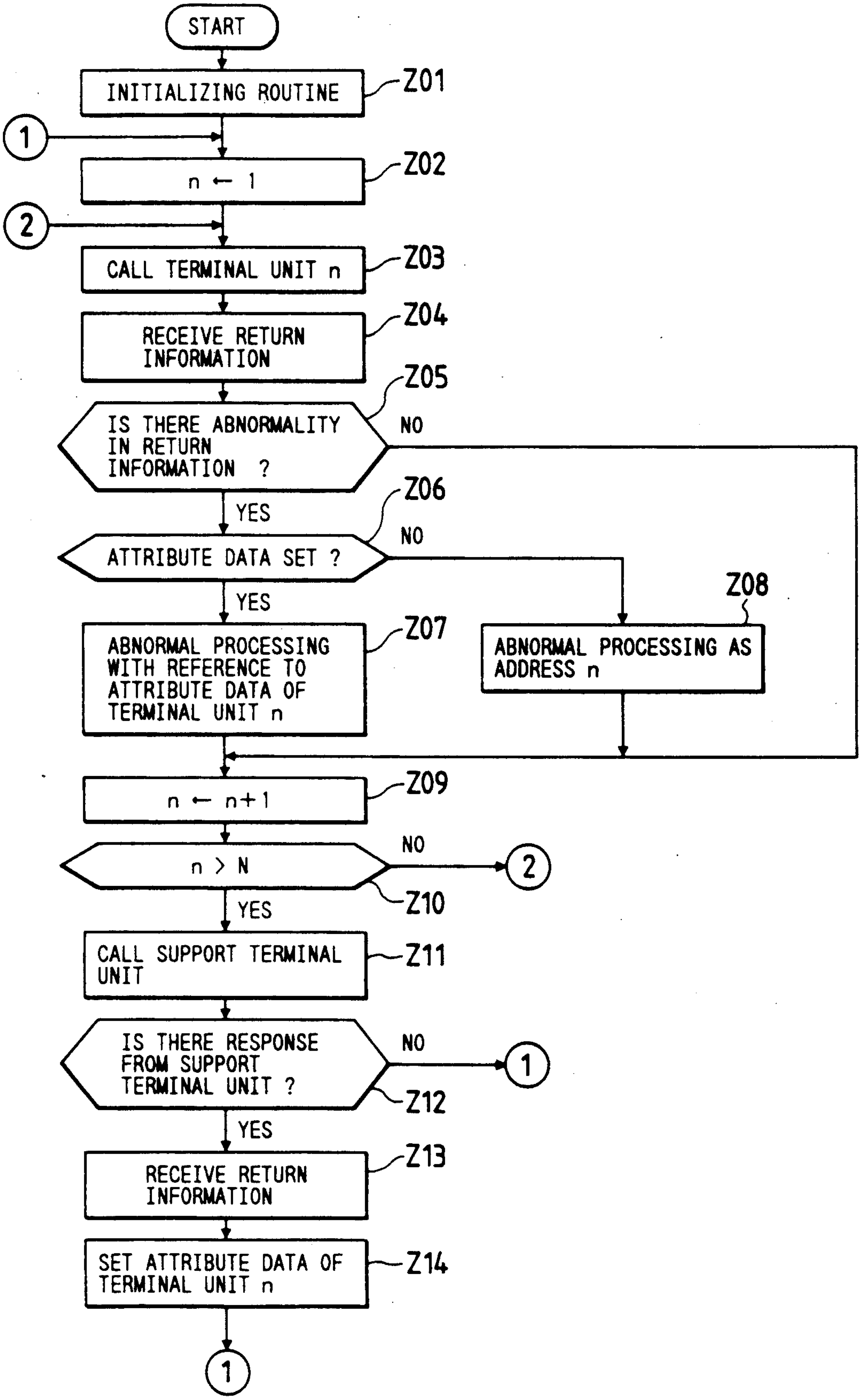
FIG. 6 is a flow chart showing one example of the processing program executed by a central monitoring station.

FIG. 6 shows a flow chart illustrating one example of the processing program executed by the central processor 10 of the central monitoring station 1. When the central monitoring station 1 is in the operating state, an initializing routine in a first step Z01 is executed to initialize the memory device and the inputting and outputting devices. In step Z02, a variable n showing the address of the terminal unit is set to 1. In step Z03, the calling operation of the terminal unit n is performed. In step Z04, the returned information from the terminal unit n are received. In step Z05, it is judged whether the return information are abnormal or not. When this judging result is YES, it proceeds to step Z06. Conversely, when this judging result is NO, it proceeds to step Z09. In the step Z06, it is judged whether the attribute data corresponding to the terminal unit n are set or not. When this judging result is YES, it proceeds to step Z07. Conversely, when this judging result is NO, it proceeds to step Z08. The step Z07 shows a routine for a processing for abnormal condition on the basis of the attribute data corresponding to the terminal unit n. The step Z08 shows a routine for displaying the address number n and performing a processing for abnormal condition by a standard judging reference. In step Z09, the variable n is increased by 1. In step Z10, it is judged whether the variable n exceeds a final address N or not. When this judging result is YES, it proceeds to step Z11. Conversely, when this judging result is NO, it returns to the step Z03, thereby proceeding to the processing of the terminal unit of the next address. In step Z11, the central monitoring station 1 calls the supporting terminal unit by an address specially allocated. In step Z12, it is judged whether there is a response from the support terminal unit or not. When this judging result is YES, it proceeds to step Z13. When this judging result is NO, it returns to the step Z02, thereby repeating the similar processing from the first address. In step Z13, the specified address and the returned information of the attribute data from the supporting terminal unit are received. In step Z14, the attribute data corresponding to the terminal unit n from the returned information are set. Namely, in accordance with the program the respective terminal units are sequentially called and judged whether or not the abnormal condition occurs based on the return information, thereby performing the monitoring processing. When the calling operation of the terminal units is performed by one cycle, the supporting terminal unit is called. Then, the attribute data are set (changed and added) when there are the return information such as the attribute data from the supporting terminal unit.

In the case in which the specified data are returned from the terminal unit, in the flow chart of FIG. 6, a step for discriminating the specified data is disposed between the steps Z04 and Z05 so that it is easy to perform the operation of the central monitoring and alarming system.

As mentioned above, in accordance with the central monitoring and alarming system of the present invention, the address of the terminal unit can be displayed by the support terminal unit connected to the transmission line the vicinity of the terminal unit side. Further, the attribute data can be written by the key-operational input of the supporting terminal unit. Accordingly, an operator can accurately know the address without looking at an address setting portion disposed within the terminal unit. Further, since the attribute data can be set during the specifying operation of the address, the error in operation is reduced. Further, since the attribute data can be changed from the terminal unit side, it is easy to efficiently adjust the operation of the central monitoring and alarming system.

What is claimed is:

1. A central monitoring and alarming system comprising:

a central monitoring station having a memory device for storing various kinds of data, said central monitoring station having an attribute data table, said central monitoring station detecting an occurrence of an abnormal condition at places monitored by said system to produce a controlling signal to control equipment for preventing disaster from expanding;

a transmission line extending from said central monitoring station to said places;

a plurality of terminal units having sensors for detecting said abnormal condition and address setting means for setting an address being assigned to each of said plurality of terminal units, said each of said plurality of terminal units being connected to said transmission line to transmit information detected by said sensors to said central monitoring station in response to an addressing signal outputted from said central monitoring station, said each of said plurality of terminal units operating an address conformity signal corresponding to a condition when an address code in said addressing signal coincides with said assigned address; and a supporting terminal unit for receiving said controlling signal and said addressing signal from said central monitoring station, said supporting terminal unit discriminating the assigned address from said addressing signal, said supporting terminal unit transmitting said assigned address and an attribute data to said central monitoring station to modify said attribute data table after said address conformity signal is received.

2. The system as claimed in claim 1, wherein said supporting terminal unit includes a indicator to display said assigned address discriminated by said supporting terminal unit and operating means.

3. The system as claimed in claim 1, wherein said memory device stores said attribute data in said attribute data table, said attribute data comprising indication data, classification data and association data, said attribute data corresponding to each of said plurality of terminal units.

4. A central monitoring and alarming system comprising:

a central monitoring station having a memory device for storing various kinds of data, said central monitoring system including an attribute data table, said central monitoring station detecting an occurrence of an abnormal condition at places monitored by said central monitoring system, said central monitoring system to produce a controlling signal to control equipment for preventing disaster from expanding;

a transmission line extending from said central monitoring station to said places;

a plurality of terminal units having sensors for detecting said abnormal condition and address setting means for setting an assigned address assigned to each of said plurality of terminal units, said each of said plurality of terminal units being connected to said transmission line to transmit information detected by said sensors to said central monitoring station in response to an addressing signal outputted from said central monitoring station; and a supporting terminal unit for receiving said controlling signal and addressing signal from said central monitoring station, said supporting terminal unit transmitting said assigned address and attribute data to said central monitoring station to modify said attribute data table.

5. The system as defined in claim 4, wherein said memory device stores said attribute data in said attribute data table, said attribute data comprising indication data, classification data and association data, said attribute data corresponding to said each of said plurality of terminal units.

6. A central monitoring and alarming system comprising:

a central monitoring station having a memory device for storing various kinds of data, said central monitoring system including an attribute data table, said central monitoring station detecting an occurrence of an abnormal condition at places monitored by said central monitoring system, said central monitoring system to produce a controlling signal to control equipment for preventing disaster from expanding;

a transmission line extending from said central monitoring station to said places;

a plurality of terminal units having sensors for detecting said abnormal condition and address setting means for setting an assigned address assigned to each of said plurality of terminal units, said each of said plurality of terminal units being connected to said transmission line to transmit information detected by said sensors to said central monitoring station in response to an addressing signal outputted from said central monitoring station; and a supporting terminal unit for receiving said controlling signal and addressing signal from said central monitoring station, one of said plurality terminal units returning at least one of information detected by said sensor and specifying data for specifying said assigned address to said central monitor, said supporting terminal unit transmitting said attribute data to said central monitoring station to modify said attribute data table.

7. The system as claimed in claim 6, wherein said memory device stores said attribute data in said attribute data table, said attribute data comprising indication data, classification data and association data, said attribute data corresponding to said each of said plurality of terminal units.

* * * * *